(12) United States Patent
Gan

(10) Patent No.: US 9,525,475 B1
(45) Date of Patent: Dec. 20, 2016

(54) ADAPTIVE DUAL POLARIZED MIMO FOR DYNAMICALLY MOVING TRANSMITTER AND RECEIVER

(71) Applicant: Facebook, Inc., Menlo Park, CA (US)

(72) Inventor: Hong Gan, San Diego, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/852,987

(22) Filed: Sep. 14, 2015

(51) Int. Cl.
  *H04B 7/06*   (2006.01)
  *H04B 1/08*   (2006.01)
  *H04B 7/04*   (2006.01)

(52) U.S. Cl.
  CPC ............ *H04B 7/0634* (2013.01); *H04B 1/082* (2013.01); *H04B 7/0413* (2013.01)

(58) Field of Classification Search
  CPC ...................................................... H04B 7/24
  See application file for complete search history.

(56) References Cited

U.S. PATENT DOCUMENTS

| 2013/0102256 A1* | 4/2013 | Cendrillon | H04B 7/08 455/63.4 |
| 2013/0243062 A1* | 9/2013 | Raju | H04L 25/0204 375/226 |

\* cited by examiner

*Primary Examiner* — Tuan H Nguyen
(74) *Attorney, Agent, or Firm* — Perkins Coie LLP

(57) ABSTRACT

Systems and methods are presented for increasing throughput between mobile transmitters/receivers (e.g., between an Unmanned Aerial Vehicle and a ground station) using orthogonally polarized transmission channels. The system may first calibrate the receiver and transmitter antenna pairs using pilot signals and then may update look up tables for feedforward correction. The system may decouple and predict the cross polarization interference due to relative dynamic movement between the transmitter and the receiver. The system may perform a closed-loop suboptimal estimation to generate refined corrections by minimizing a difference between a training vector and a pilot-signal feedback. Cross-polarization discrimination between the transmission and reception antennas may then be Cancelled to improve signal to noise and interference ratio and performance of the system.

22 Claims, 12 Drawing Sheets

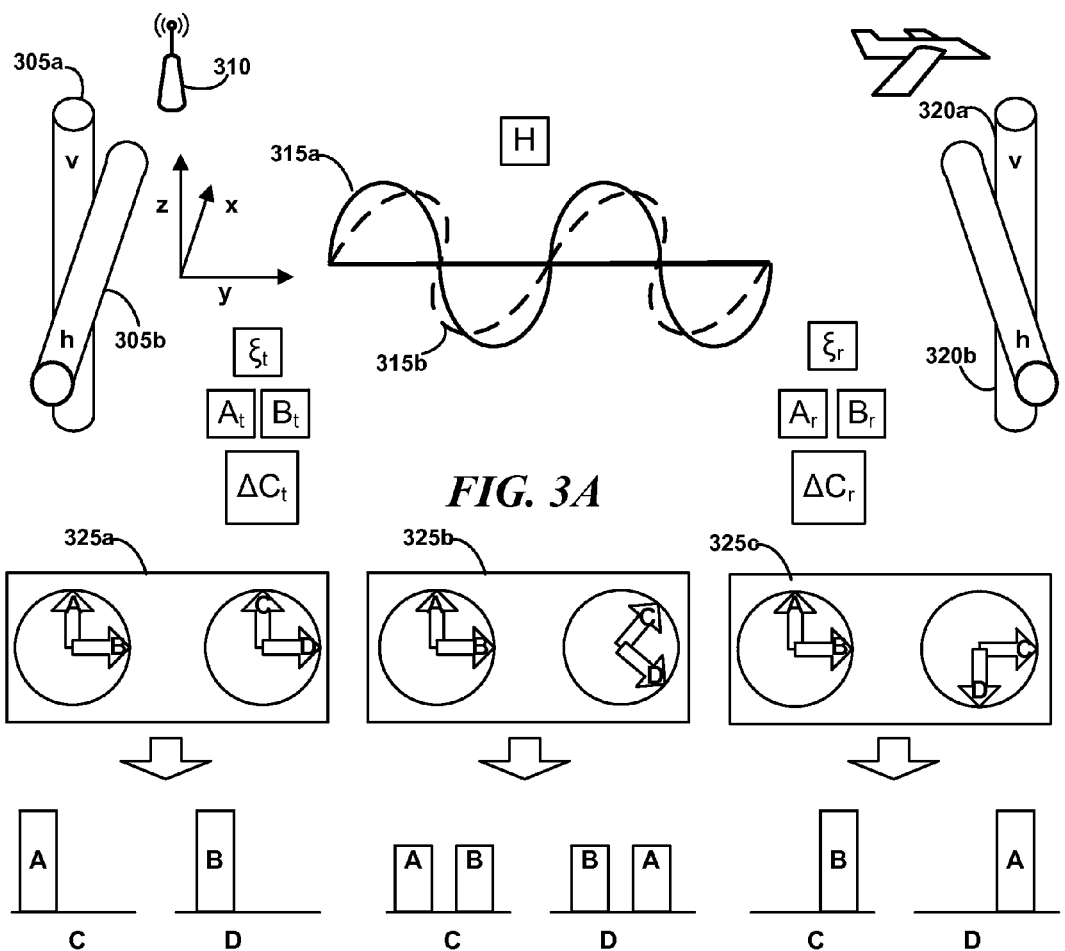
*FIG. 3A*
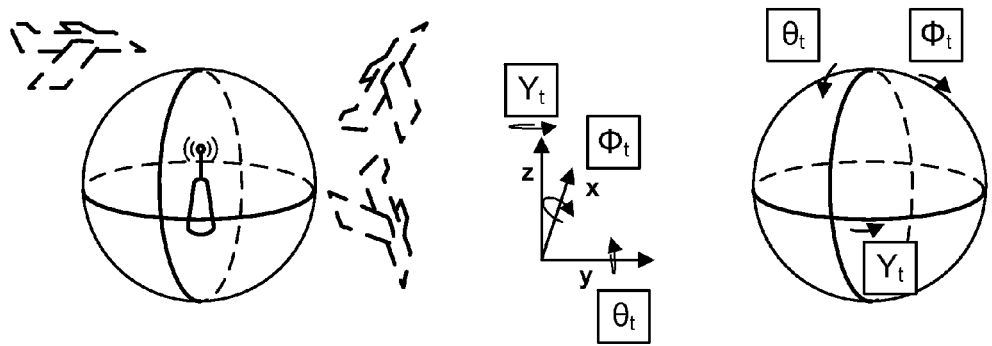
*FIG. 3B*
*FIG. 3C*

$$\begin{bmatrix} T_h \\ T_v \end{bmatrix} = \begin{bmatrix} \cos\xi_h & -\sin\xi_v \\ \sin\xi_h & \cos\xi_v \end{bmatrix} \begin{bmatrix} S_h \\ S_v \end{bmatrix}$$

(430)

$$\xi_h = \xi_{h_0} + \overline{\xi_h} + \Delta\xi_h$$

$$\xi_v = \xi_{v_0} + \overline{\xi_v} + \Delta\xi_v$$

$$\underbrace{\xi_h}_{\hat{\xi}_h}, \quad \underbrace{\xi_v}_{\hat{\xi}_v}$$

$$\begin{bmatrix} T_h \\ T_v \end{bmatrix} = \underbrace{\begin{bmatrix} \cos\hat{\xi}_h & -\sin\hat{\xi}_v \\ \sin\hat{\xi}_h & \cos\hat{\xi}_v \end{bmatrix}}_{\hat{A}_t} \begin{bmatrix} S_h \\ S_v \end{bmatrix} + \underbrace{\begin{bmatrix} -\sin\hat{\xi}_h & \cos\hat{\xi}_v \\ \cos\hat{\xi}_h & -\sin\hat{\xi}_v \end{bmatrix}}_{\hat{B}_t} \underbrace{\begin{bmatrix} \Delta\xi_h & 0 \\ 0 & \Delta\xi_v \end{bmatrix}}_{\Delta\hat{C}_t} \begin{bmatrix} S_h \\ S_v \end{bmatrix}$$

STATIONARY RECEIVER / MOVING TRANSMITTER

605

$$\begin{bmatrix} U_h \\ U_v \end{bmatrix} = A_r H(\hat{A}_t + (\hat{B}_t)(\Delta \hat{C}_t)) \begin{bmatrix} S_h \\ S_v \end{bmatrix}$$

MOVING RECEIVER / MOVING TRANSMITTER

610

$$\begin{bmatrix} U_h \\ U_v \end{bmatrix} = (\hat{A}_r + (\hat{B}_r)(\Delta \hat{C}_r))^T H (\hat{A}_t + (\hat{B}_t)(\Delta \hat{C}_t)) \begin{bmatrix} S_h \\ S_v \end{bmatrix}$$

MOVING RECEIVER / MOVING TRANSMITTER – REORDERED TERMS

615

$$\begin{bmatrix} U_h \\ U_v \end{bmatrix} = [\hat{A}_r^T H \hat{A}_t + \Delta \hat{C}_r^T \hat{B}_r^T H \hat{A}_t + \hat{A}_r^T H \hat{B}_t \Delta \hat{C}_t] \begin{bmatrix} S_h \\ S_v \end{bmatrix}$$

*FIG. 6*

ADAPTIVE DUAL POLARIZED MIMO FOR DYNAMICALLY MOVING TRANSMITTER AND RECEIVER

TECHNICAL FIELD

The disclosed embodiments relate to wireless communication using polarized antenna systems.

BACKGROUND

Dual polarized feed antennas transmit and receive electromagnetic signals in two orthogonal special domains. Such configurations can be especially useful for wireless communication links where transmitters and receivers are constrained for power or weight, e.g., an unmanned aerial vehicle (UAV) enabled high altitude platform (HAP) links. For example, when communicating between an aerial device, e.g., a UAV, and a ground station or a peer aerial device, a dual polarized antenna communication system could double the throughput without using additional antenna and associated tracking system. However due to the maneuvering moving of a UAV, the orthogonality is difficult to maintain and the RXs are degraded dramatically, the applications using dual polarized feed antennas have generally been limited to fixed point-to-point communications. Cross-polarization discrimination (XPD) resulting from non-ideal antenna implementations, channel distortion resulting from atmospheric propagation, and aerial vehicle maneuverability each adversely impact the achievable Signal-to-Noise Ratio (SNR). Until these factors are adequately addressed, dual polarized feed antennas' applicability in a dynamic context will be limited.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 3A is block diagram illustrating various variables and components relevant to some embodiments; FIG. 3B is block diagram illustrating the effects of cross-polarization as may occur in some embodiments; FIG. 3C is block diagram illustrating orientations corresponding to various variables referenced in some embodiments;

FIG. 5 is a series of equations associated with cross-polarization factors assessed in certain embodiments;

FIG. 6 is a series of equations reflecting signal processing as may be considered in some embodiments;

Figure 1A:
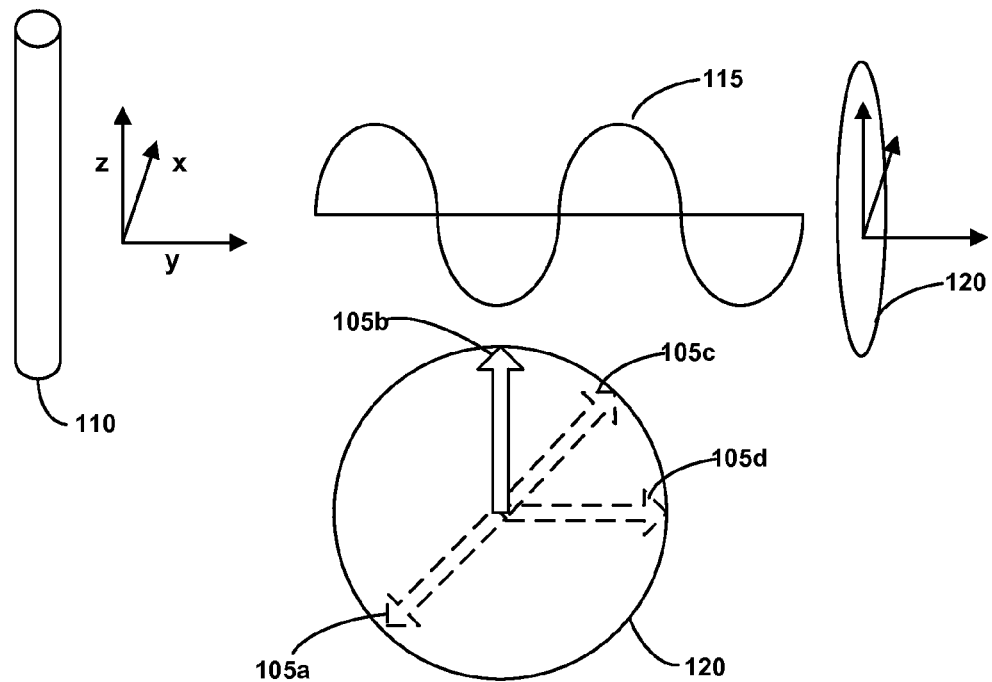
FIG. 1A is a block diagram illustrating a vertically polarized signal as may be implemented in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Systems and methods are presented for increasing throughput between mobile transmitters/receivers (e.g., between an Unmanned Aerial Vehicle (UAV)/Unmanned Aerial System (UAS) and a ground station) using orthogonally polarized transmission channels. The system may first calibrate the receiver and transmitter antenna pairs using pilot signals before motion. Note that each of the UAV and ground station may have a transmitter and receiver corresponding to a receiver and transmitter at its counterpart. Similarly, though some examples described herein will refer to the UAV or ground station as the "transmitter" or "receiver" one will readily recognize that the roles could be reversed. The system may then provide suboptimal estimation correction by minimizing a difference between a training vector and a pilot-signal determined channel matrix. Cross-polarization discrimination between the antennas may then be determined. Bayesian methods may also be applied in some embodiments to modify the channel matrix in use. Specific architectures for implementing the above-referenced method at the transmitting and receiving devices are also provided.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

FIG. 1A is a block diagram illustrating a vertically polarized signal as may be implemented in some embodiments. An idealized antenna 110 may be oriented so as to be parallel with a z-axis in a given reference frame. Radiation emitted from this antenna 115 may accordingly be polarized along the z-axis and will ideally retain such polarization when intersecting a distant surface 120. Accordingly, a receiving antenna at the position of surface 120 would receive the entirety of the polarized signal if it was likewise configured to receive the signal along the z-axis (i.e., orientation 105b). At a relative 45 degree rotation, corresponding to each of orientations 105a and 105c, the signal 115 would be received at approximately half the strength. At an orientation rotated at 90 degrees, e.g., an orientation 105d, none of the signal 115 would be received.

Figure 1B:
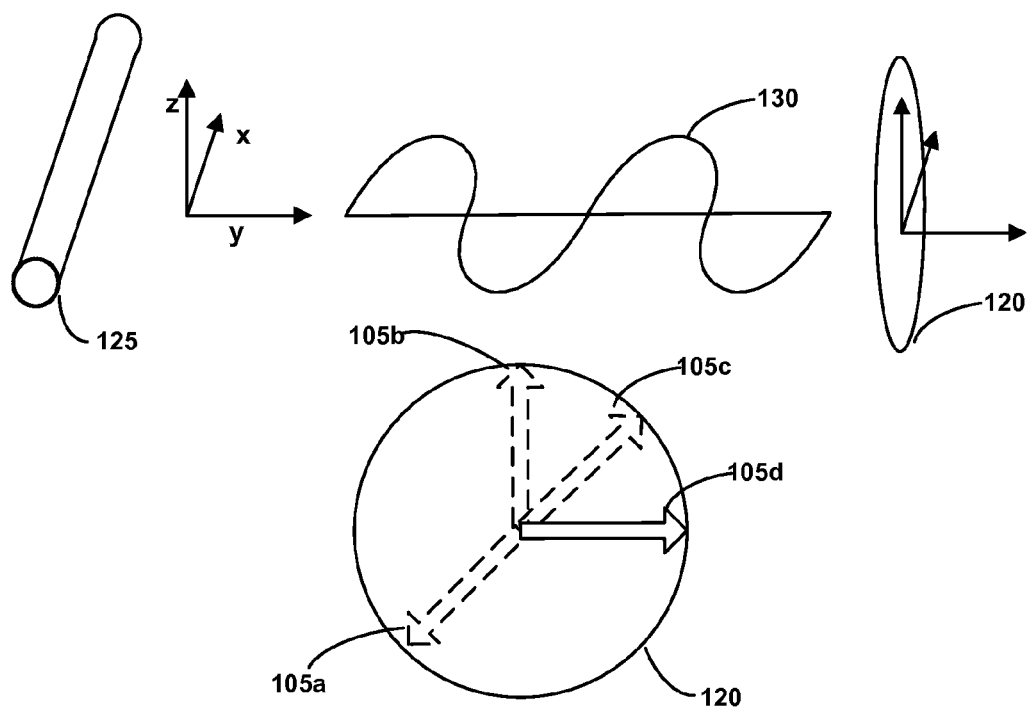
FIG. 1B is a block diagram illustrating a horizontally polarized signal as may be implemented in some embodiments.

Conversely, FIG. 1B is a block diagram illustrating a horizontally polarized signal 130 emitted from an antenna 125 in a corresponding configuration. In this case, a receiver in orientation 105d would receive all of signal 130, a receiving antenna in either of orientations 105a and 105c would receive signal 130 at half strength, and a receiving antenna in orientation 105b would receive none of signal 130. In some embodiments of a transmission and reception system in which dual polarized antennas are used, two independent signals may be transmitted and received concurrently. These two transmitted signals, represented as a first component Uh and a second component Uv that is orthogonal to the first component (i.e., Uv·Uh=0) may be fed through orthogonal polarized electromagnetic antenna elements. For example, Uv can be vertical for linearly polarized or left for circular polarized component, and Uh is the orthogonal counterpart of Uv, which is the horizontal for linearly polarized or the right left component for circular polarized signals. In such systems, cross-polarization discrimination (XDP) may thus refer to a component of Uv projected in the direction of Uh, or a component of Uh projected in the direction of Uv, and thus may result in a receiver receiving the projection component of Uh along with the signal Uv or component of Uv in the direction of Uh, along with Uh, which may seem to be interference to the receiver.

Figure 2:
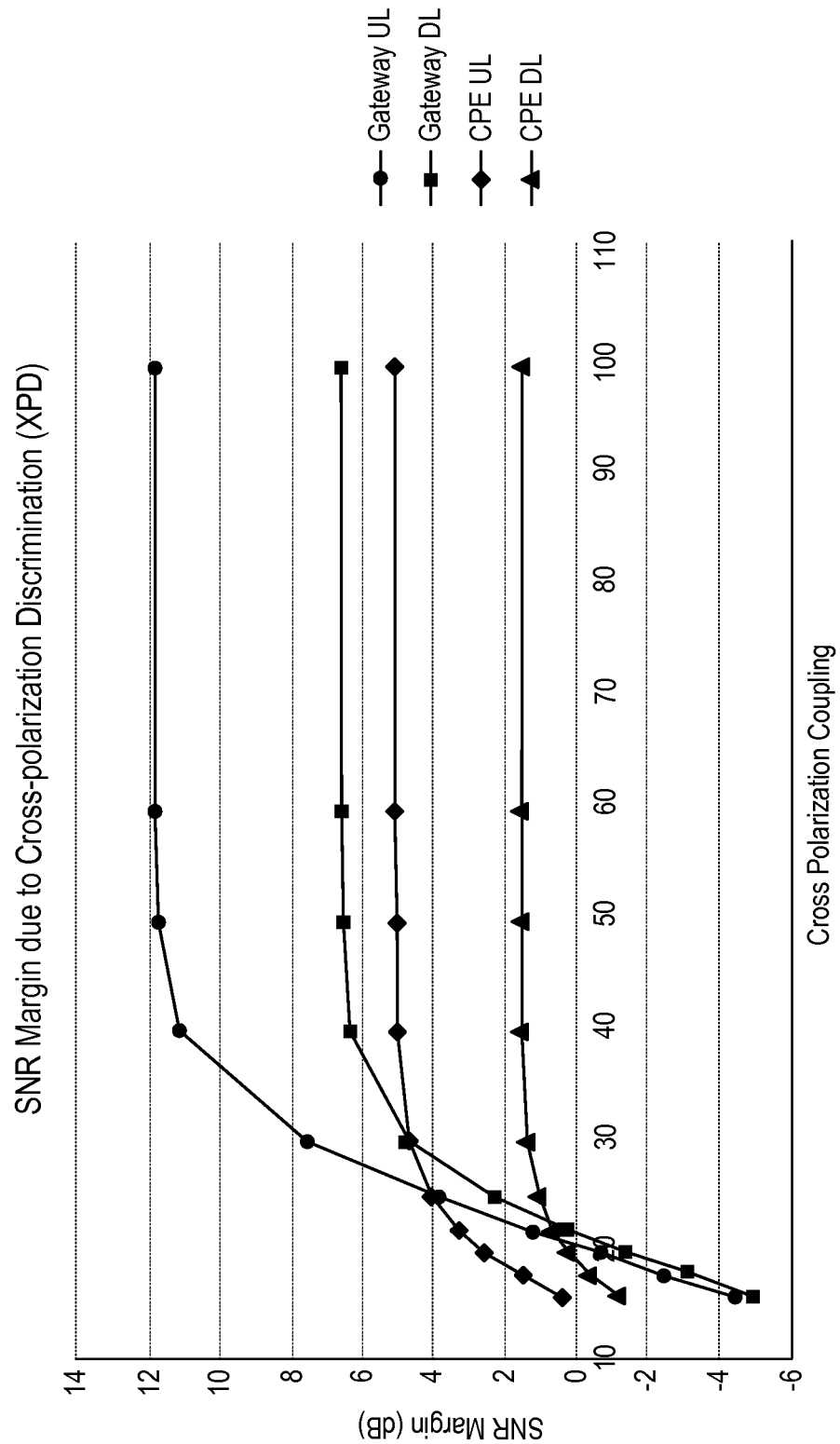
FIG. 2 is a plot of an example of the Signal-to-Noise-Ratio (SNR) Margin relative to the percentage of cross polarization coupling as may be considered in some embodiments.

As discussed, cross-polarization discrimination (XPD) resulting from non-ideal antenna implementations, channel distortion resulting from atmospheric propagation, and aerial vehicle maneuverability may each adversely impact the achievable Signal-to-Noise Ratio (SNR). FIG. 2 is a plot of the SNR Margin relative to the percentage of cross polarization coupling. As the data rate and power increase, the degradation likewise increases. To address this problem, various embodiments correct for the XPD in transmission and/or reception to enable the use of dual polarized feed antennas.

System Model—Mathematical Model

Various embodiments consider transmission and reception systems each having orthogonally polarized antenna pairs. FIG. 3A is a block diagram illustrating various variables and components relevant to some embodiments. A transmitter may have a vertically polarized 305a and a horizontally polarized 305b antenna. The receiver may then receive the signal from across the channel using vertically polarized antenna 310a and horizontally polarized antenna 310b. The cross-polarization angle between the antennas at the transmitter is reflected by (and likewise $\xi_r$ for the receiver). As discussed in greater detail with respect to FIG. 5, each of and may be decomposed into its constituent contributions to the cross-polarization across the channel. These effects may be embodied for the transmitter in a base matrix $A_t$, a cross-polarization matrix $\Delta C_t$, and a base cross-correlation matrix $B_t$ with similar counterparts at the receiver. When the angle between one received orthogonal component Uvr and the corresponding transmitted component Uht is 90 degrees, and the received other orthogonal component Uhr and the transmitted other orthogonal component Uvt is 90 degree, then the polarization components meet the orthogonality condition Uv·Uh=0, and may be referred to as matched Uv and U. When a difference of an angle $\xi$ occurs, the dual polarized transmissions/receptions (TRXs) are not matched. The mismatch angle $\xi_t$ and $\xi_r$ denote the delta angle offset from 90 degree for the two orthogonal components.

FIG. 3B is block diagram illustrating the effects of cross-polarization as may occur in some embodiments. In situation 325a, the transmitter and receivers may be properly aligned such that no cross-polarization results. That is, the vertical A signal arrives at the vertical C antenna without interference from the horizontal B signal and the horizontal B signal arrives at the horizontal D antenna without interference from the vertical A signal. In situation 325b, the transmitter and receivers are misaligned at a roughly 45 degree angle and accordingly portions of the A signal are appearing on both antennas D and D. In situation 325c, the transmitter and receivers are at 90 degree angles and consequently the signals are completely cross-polarized.

Figure 4:
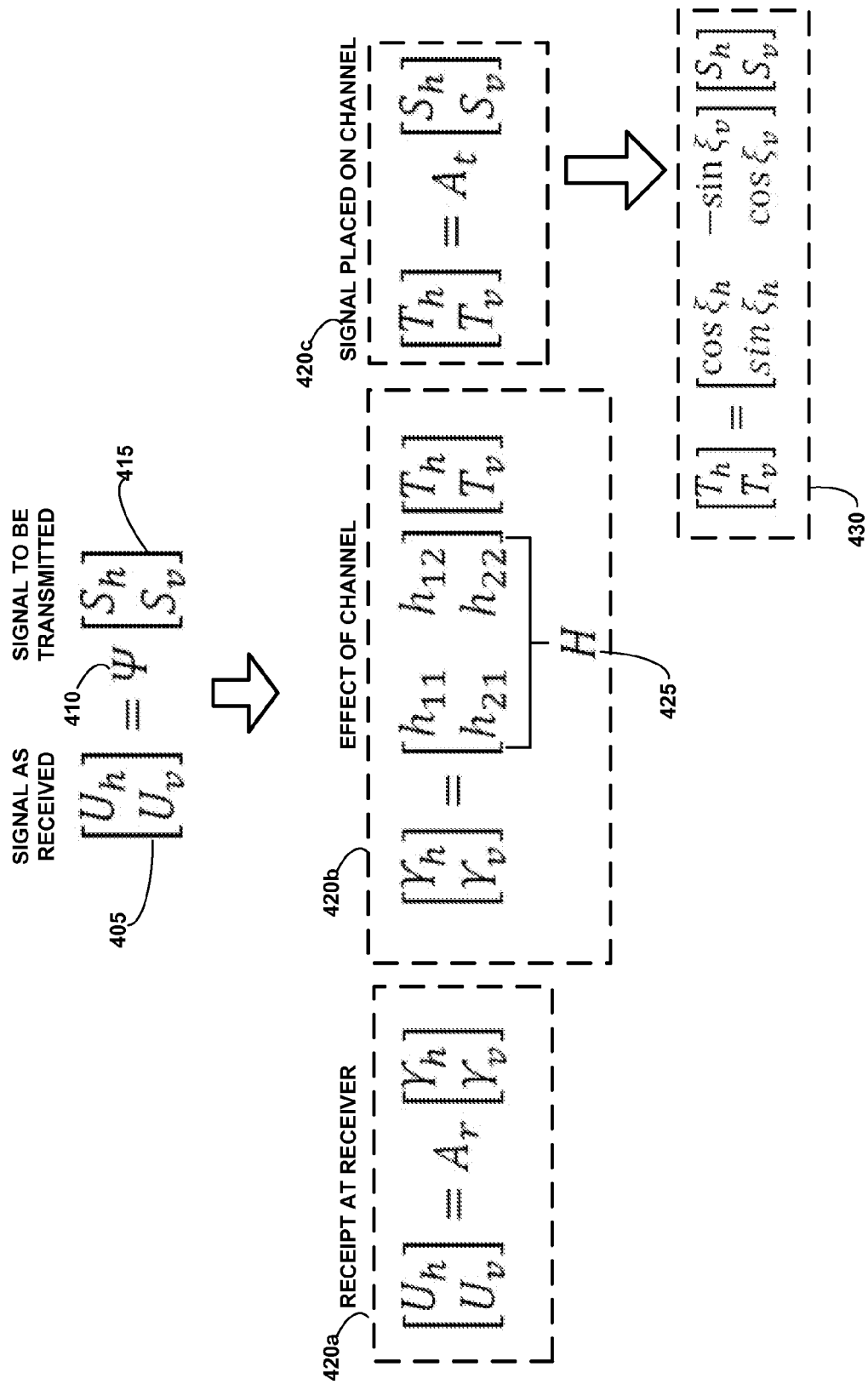
FIG. 4 is a series of equations associated with factors assessed in certain embodiments.

FIG. 3C is block diagram illustrating orientations corresponding to various variables referenced in some embodiments. As indicated, $\phi_t$, $Y_t$, and $\theta_t$ reflect the respective orientations of the transmitter to the receiver. In FIG. 3A, FIG. 3B and FIG. 3C, the instantaneous Uv and Uh for an earth station can be described using the earth coordinates, and the instantaneous Uv and Uh for a UAV can be described using UAV body coordinates with the corresponding attitudes that are well defined in literature System Model—Mathematical Model—Channel Modeling Equations FIG. 4 is a series of equations associated with factors assessed in certain embodiments. Generally speaking, a distorted signal 405, received at the receiver may be generated by applying a transformation matrix 410 to the originally transmitted signal 415. The transformation matrix 410 may reflect the channel's contribution to the distortion as well as the antenna polarization's contribution at each of the transmitters and receivers. These effects are decomposed into the more explicit series of equations 420a, 420b, and 420c. Equation 420b simply reflects the effect of the channel 425 on the transmitted signal. The matrices $A_t$ and $A_r$ generally reflect the cross polarization effect of the antennas at each of the transmitter and receiver. These matrices can be more thoroughly decomposed into their components as reflected in equation 430, which shows the signal interference components due to XPD distortion.

FIG. 5 is a series of equations associated with cross-polarization factors assessed in certain embodiments. Antenna polarization mismatch is partitioned into three parts in static mismatch $\xi_{h0}$, the dynamic mismatch $\overline{\xi_v}$ due to UAV moving, and the random projections $\Delta\xi_h$ due to external physical factors such as the channel and wind, etc. Particularly, equation 430 may be more thoroughly decomposed by recognizes that the horizontal $\xi_h$ and vertical $\xi_v$ cross-polarization components may be decomposed into: an initial component 510a, 510b; a time variable component 515a, 515b; and an offset component 520a, 520b, showing the mismatch components. The initial component 510a, 510b and time variable component 515a, 515b may be grouped into a single base component 525a, 525b. In this manner, equation 420c may be rewritten as equation 530 that decouples the mismatch sources as having base matrix $A_t$, a cross-polarization matrix $\Delta C_t$, and a base cross-correlation matrix $B_t$, thus showing nonlinear XPD due to initial and UAV dynamic movement and linear random mismatch sources. A counterpart equation exists for the receiver side may be written in an analogous manner.

FIG. 6 shows an example of an algorithm that implements the nonlinear UAV moving dynamic invoked prediction of the XPD interference. An example that uses this algorithm can be implemented in three steps. The first step is the stationary open loop from the a priori and lookup table. The second step is the UAV flight dynamic involved nonlinear prediction. The third step is Bayes optimal closed loop correction. The three steps are represented in equations 605, 610, and 615 respectively, reflecting signal processing as may be considered in some embodiments based on the results of FIGS. 4 and 5. Equation 605 provides an example of how to estimate the initial and stationary interference, i.e., the behavior when both the transmitter and receiver are stationary. Equation 610 reflects the behavior when both the transmitter and receiver are moving, e.g., dynamic prediction and optical estimation with UAV moving dynamics. Equation 615 reflects a recursive Bayesian process with the same behavior as in equation 610, but with the terms reordered.

Example Channel and Cross-Polarization Compensation Process

Figure 7:
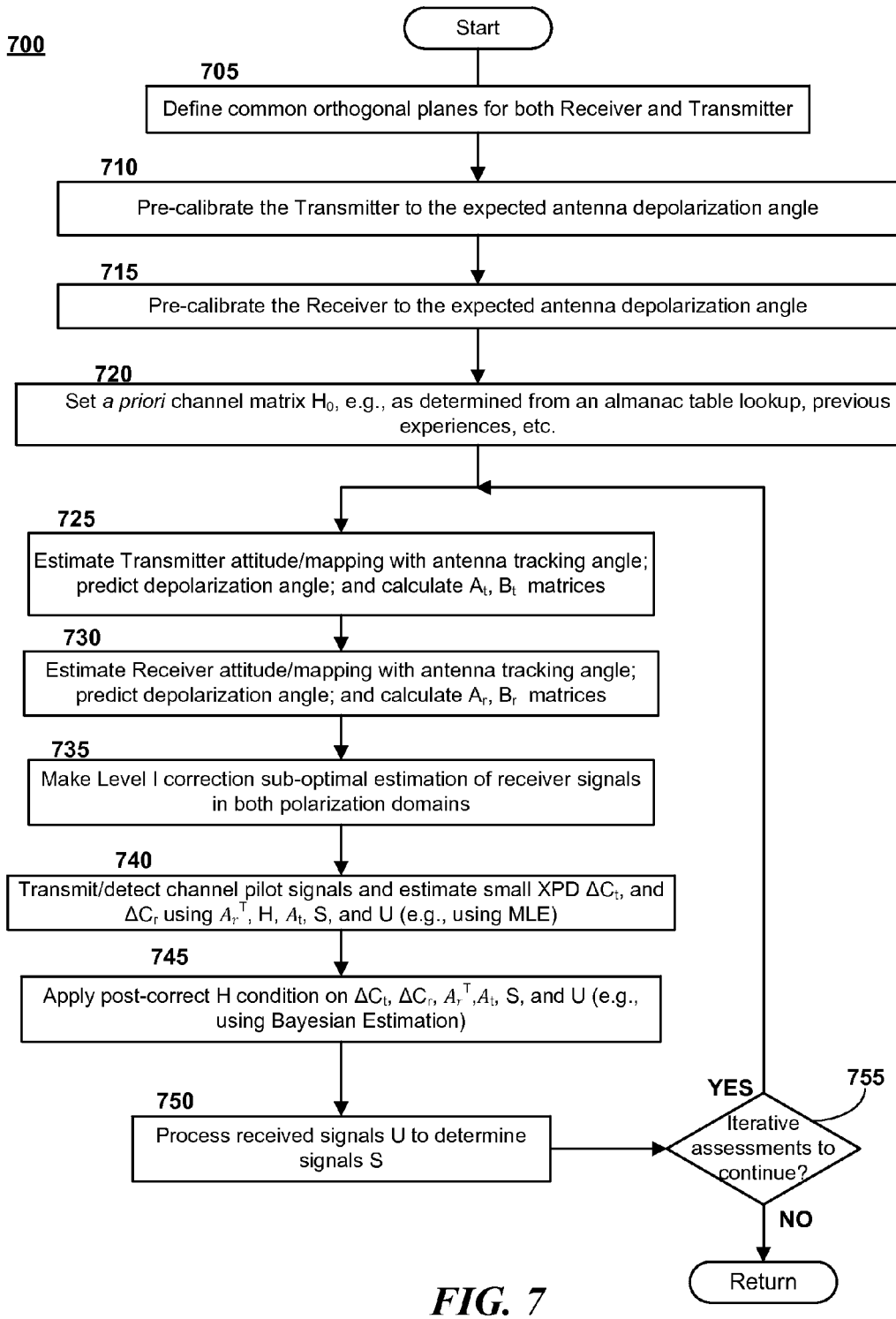
FIG. 7 is a flow diagram illustrating steps in a cross-polarization calibration and reassessment process as may be considered in some embodiments.

Given the representation of FIG. 6 various embodiments present methods for determining intermediate components to facilitate a more general recovery of the source transmission at the receiver. FIG. 7 is a flow diagram illustrating steps in a cross-polarization calibration and reassessment process as may be considered in some embodiments. At block 705, each of the transmitter and receiver systems may define common orthogonal planes. At block 710, the transmitter may pre-calibrate to the expected antenna depolarization angle. At block 715, the receiver may likewise pre-calibrate to the expected antenna depolarization angle.

At block 720, each of the transmitter and receiver may set an a priori channel matrix $H_0$, e.g., as determined from an almanac table lookup, past operations, etc. At block 725, the receiver may estimate the transmitter's attitude/mapping with the antenna tracking angle. The system may predict the depolarization angle and calculate the $A_t$ and $B_t$ matrices.

At block 730, the transmitter may estimate the receiver's attitude/mapping with the antenna tracking angle, predict depolarization angle, and calculate $A_r$, $B_r$ matrices. At block 735, the receiver system may make level I correction sub-optimal estimation in both polarization domains. At block 740, the transmitter may transmit, and the receiver may detect, channel pilot signals which are used to estimate the small cross-polarization $\Delta C_t$, $\Delta C_r$, using $A_r^T$, $A_t$, H, S, and U (e.g., using maximum likelihood estimation). At block 745, the system may apply post-corrected H conditions on $\Delta C_t$, $\Delta C_r$, $A_r^T$, $A_t$, S, and U (e.g., using Bayesian Estimation). At block 750, the receiver may process received signals U to determine signals S. If iterative assessments are to continue at block 755, then the system may repeat the operations beginning at block 725.

Figure 8:
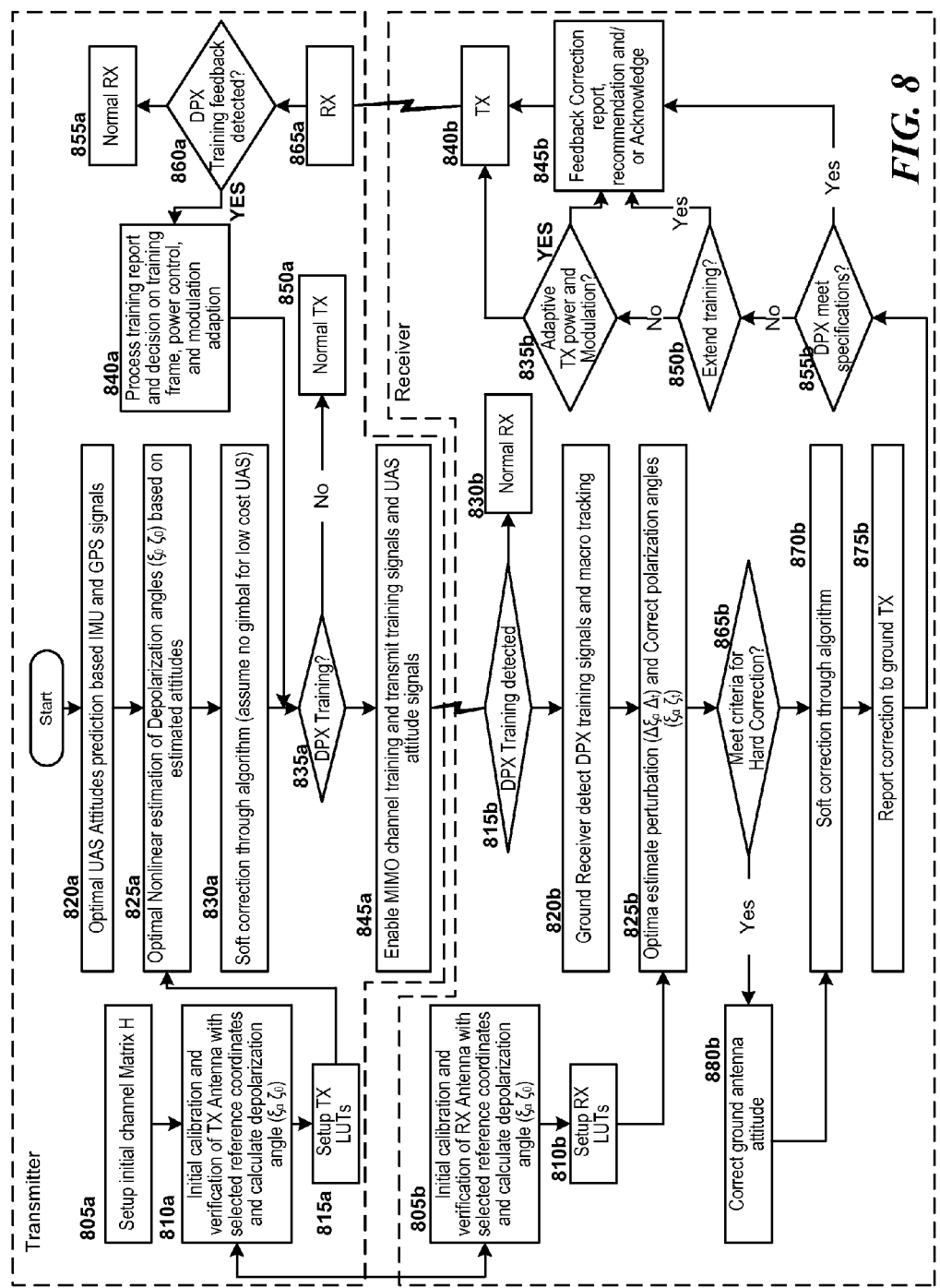
FIG. 8 is a flow diagram illustrating steps in a cross-polarization calibration and reassessment process as may be considered in some embodiments.

FIG. 8 is a flow diagram illustrating steps in a cross-polarization calibration and reassessment process as may be considered in some embodiments. At block 805a, the transmitter may initialize a channel matrix H, e.g., using an almanac as described above. At block 810a, the transmitter may perform an initial calibration and verification of the transmitter antenna with the selected reference coordinates and may calculate depolarization angle ($\xi_0$, $\zeta_0$). At block 815a, the transmitter may set up the transmitter look-up tables (LUTs).

At block 820a, the transmitter may determine the optimal receiver attitudes prediction based upon IMU data and GPS signals. At block 825a, the transmitter may use the LUTs to determine the optimal nonlinear estimation of the depolarization angles ($\xi_0$, $\zeta_0$) based on estimated attitudes. At block 830a, the system may perform soft correction through the method described above (some embodiments may assume there is no gimbal for low cost aerial receivers).

At block 840a, the transmitter may process a received training report and decision based on a training frame, power control, and modulation adaption. The results may be used to determine at block 835a, if cross-polarization discrimination training is to be performed. If no training is to be performed, then normal transmissions may be performed at block 850a. The training report may have been received when cross-polarization discrimination training feedback was detected at block 860a following reception at block 865a (normal reception operations may occur at block 855a, when no data is detected). At block 820b, the ground receiver may detect the cross-polarization discrimination training signals and macro tracking.

At block 805b, the receiver may also perform an initial calibration and verification of the receiver antenna with selected reference coordinates and calculate depolarization angle ($\xi_0$, $\zeta_0$). At block 810b, the receiver may setup the receiver LUTs.

Where training is to be performed, at block 845a the transmitter may enable MIMO channel training and transmit training signals and UAS attitude signals. At block, 815b the receiver may receive the cross-polarization discrimination training signals (where no such signals are present, normal reception may occur at block 830b).

At block 825b, the LUTs, cross-polarization discrimination training signals and macro tracking may be used to determine an optimal estimate perturbation ($\Delta\xi_a$ $\Delta_r$) and correct polarization angles ($\xi_a$, $\zeta_r$). If the criteria for hard correction are met at block 865b, then the receiver may correct the ground antenna attitude at block 880b, before performing soft correction at block 870b. The correction may be reported to the ground station at block 875b.

At block 835b, the receiver may report the correction to the transmitter. If the cross-polarization discrimination specifications are met at block 855b or if extended training is to be performed at block 850b, then the receiver may perform a feedback correction report, recommendation and/ or acknowledge at block 845*b*. At block 840*b*, the receiver may communicate with the transmitter.

Example Channel and Cross-Polarization Compensation System

Figure 9:
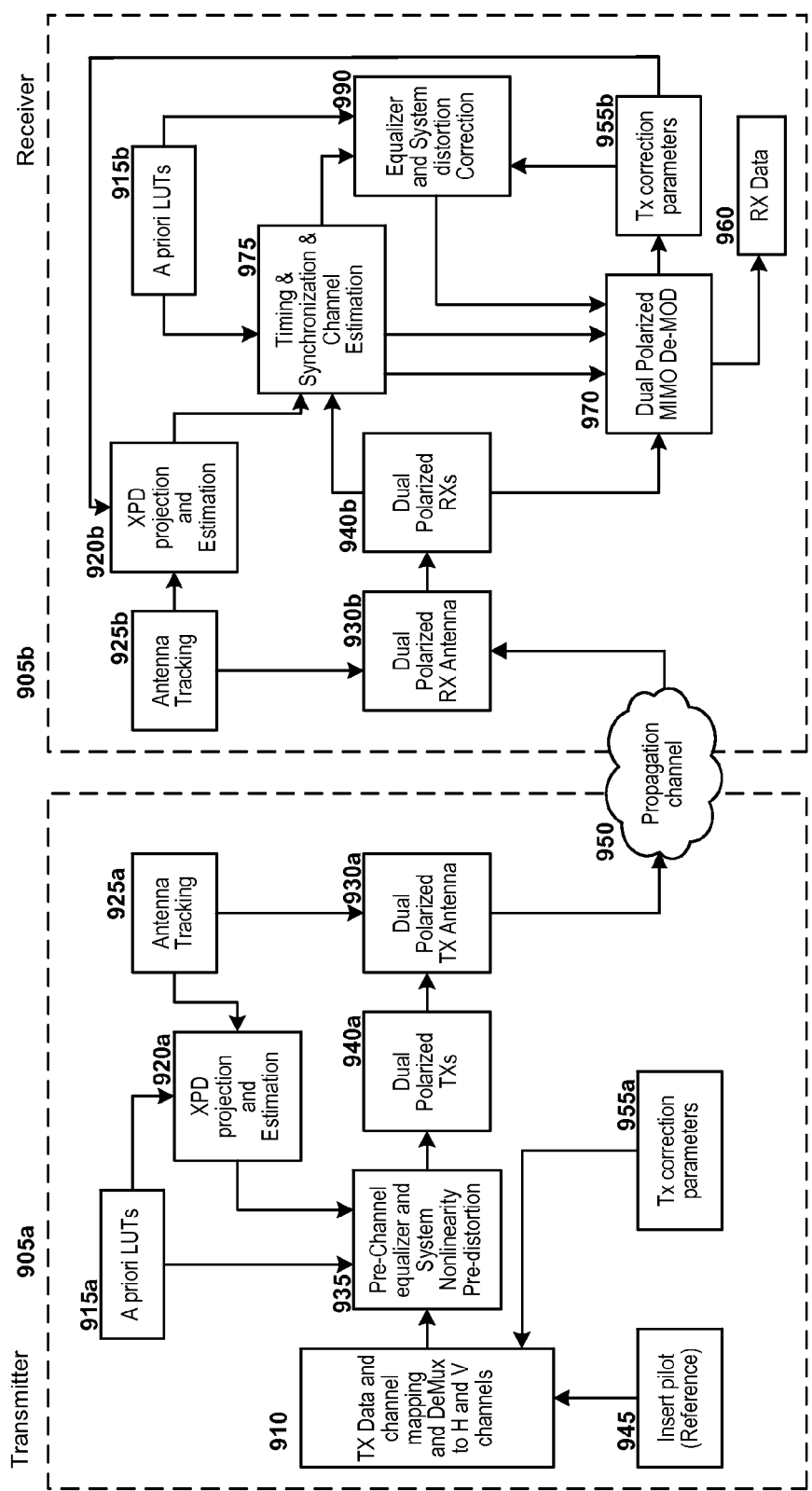
FIG. 9 is a block diagram illustrating components in a cross-polarization calibration and reassessment system as may be considered in some embodiments.

FIG. 9 is a block diagram illustrating components in a cross-polarization calibration and reassessment system as may be considered in some embodiments. A transmitter 905*a* may include a module 910 to perform transmitter data and channel mapping and de-multiplexing to H and V channels. These may be based on a pilot signal 945 and Transmission correction parameters 955*a*. The results may be provided to a Pre-Channel equalizer and System Nonlinearity Pre-distortion module 935. The module may also receive priori LUTs 915*a* and cross-polarization discrimination projection and estimation 920*a* derived from antenna tracking 925*a*.

The results may be used to generate dual polarized transmission signals 940 which are placed on the antenna 930*a*. These may be received at a receiver 905*b* across a Propagation channel 950 at a dual polarized reception antenna 930*b*. The antenna may itself be oriented using antenna tracking 925*b*. Dual polarized reception signals 940*b* may be derived and provided to each of a Timing & Synchronization & Channel Estimation module 975 and a dual polarized MIMO De-MOD 970. The Timing & Synchronization & Channel Estimation module 975 may consider the results of the cross-polarization discrimination projection and estimation module 920*b*.

An Equalizer and System distortion Correction module 990 may provide corrections to the Dual Polarized MIMO De-MOD 970 based on the priori LUTs 915*b*, transmission correction parameters 955*b*, and the output of Timing & Synchronization & Channel Estimation module 975. Dual Polarized MIMO De-MOD 970 may then output the recovered Rx data 960.

Figure 10:
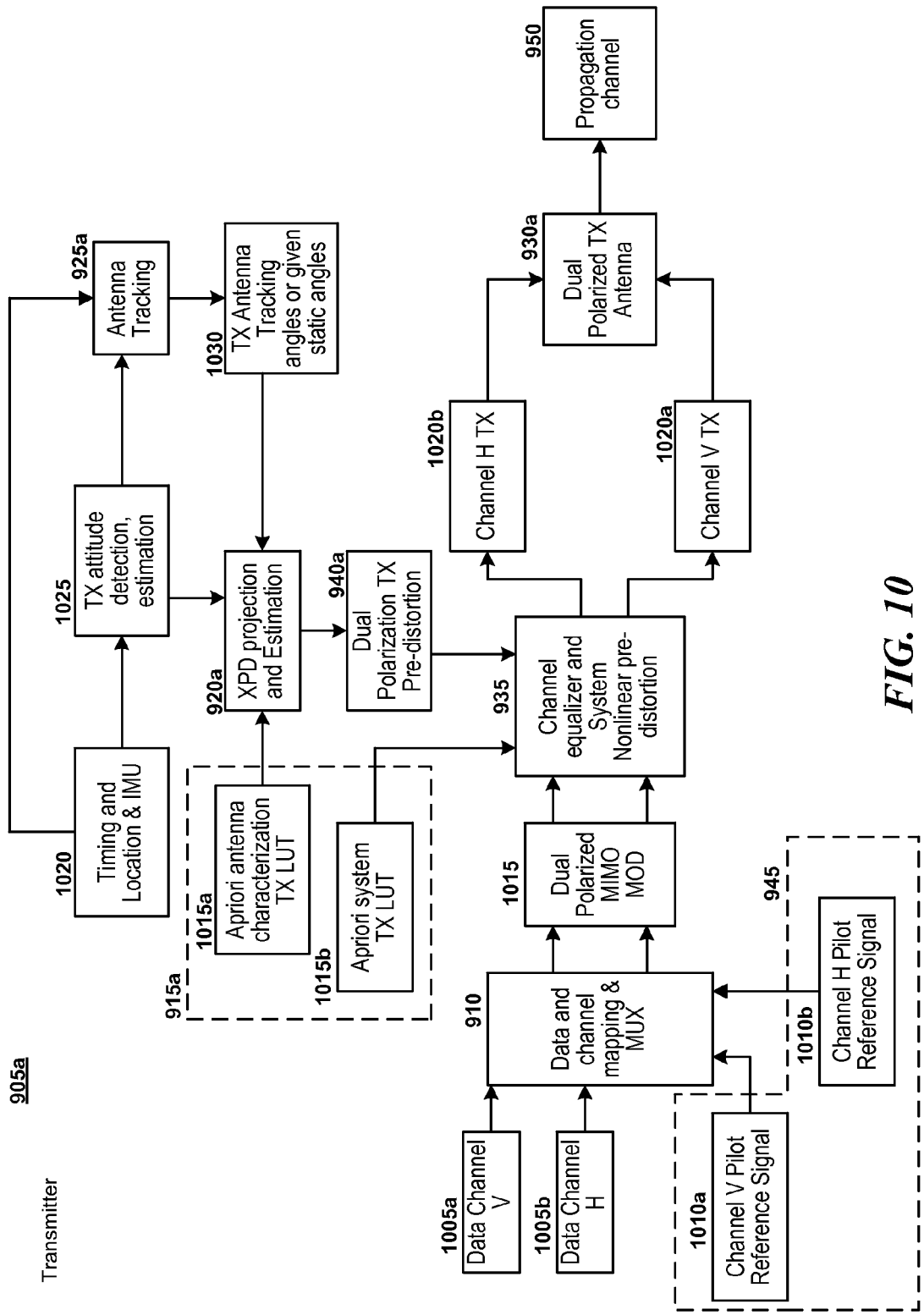
FIG. 10 is a block diagram illustrating transmission-side components in a cross-polarization calibration and reassessment system as may be considered in some embodiments.

FIG. 10 is a block diagram illustrating transmission-side components in a cross-polarization calibration and reassessment system as may be considered in some embodiments. To clarify the character of the components depicted in FIG. 9, the transmitter's data and channel mapping and MUX 910 may receive pilot signals 1010*a*, 1010*b* as well as regular vertical 1005*a* and horizontal 1005*b* channel data.

Apriori LUTs 945 may include a prior antenna characterization transmission LUT 1015*a* and a prior system transmission LUT 1015*b*. A Dual Polarized MIMO MOD 1015 may operate on data from the data and channel mapping and MUX 910 and provide the results to the channel equalizer and system nonlinear pre-distortion module 935. Timing, location, IMU data 1020, transmission attitude detection data 1025, and transmission antenna tracking angles or a given static angle, may be used with the antenna tracking data 925*a* to inform the cross-polarization discrimination projection and estimation 920*a*. The channel transmission may comprise horizontal 1020*b* and vertical 1020*a* components.

Figure 11:
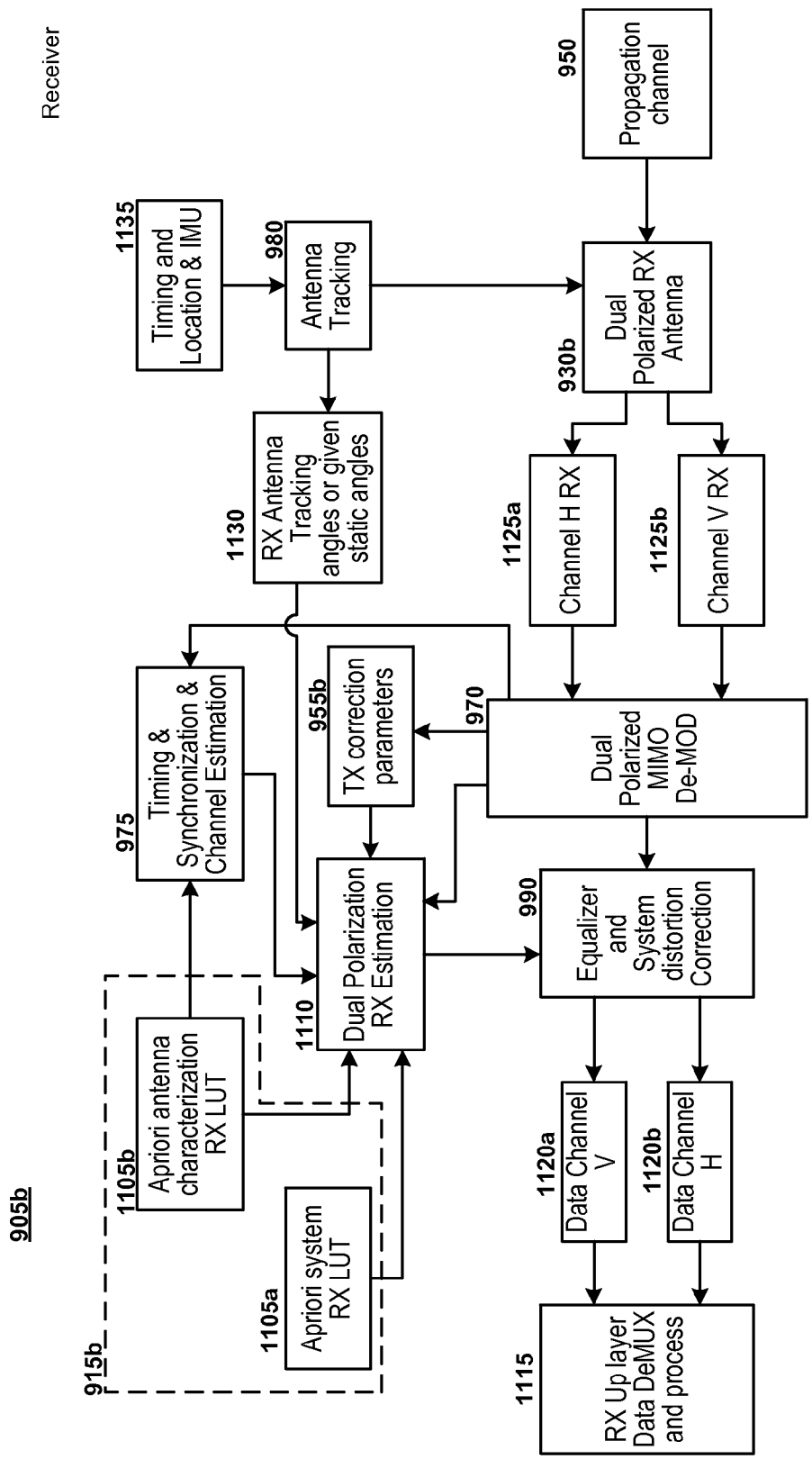
FIG. 11 is a block diagram illustrating reception-side components in a cross-polarization calibration and reassessment system as may be considered in some embodiments.

FIG. 11 is a block diagram illustrating reception-side components in a cross-polarization calibration and reassessment system as may be considered in some embodiments. Again, to be clear, each of a horizontal channel signal 1125*a* and a vertical channel signal 1125*b* may be received from the receiver's antennas. The LUTs 915*b* may include a prior system receiver LUT 1105*a* and an apriori antenna characterization receiver LUT 1105*b*. A Dual Polarization receiver Estimation module 1110 may relay is results to the Equalizer and System distortion Correction module 990. The received signal may be decomposed into a vertical data channel 1120*a* and a horizontal data channel 1120*b*. A receiver up layer data de-multiplexer and process module 1115 may ultimately generate the recovered transmission signal.

Timing and location IMU data 1135 and the receiving antenna's tracking and static angles 1130 may be used in conjunction with the antenna tracking 980 to generate an input to the dual polarization receiver and estimation module 1110.

In some embodiments, a receiver communication device includes an antenna arrangement configured to concurrently receive and transmit two independent signals along two orthogonally polarized fields, over two orthogonally polarized channels, at least one processor, and at least one memory comprising instructions configured to cause the at least one processor to determine an apriori channel matrix, estimate a transmitter base matrix, and a transmitter base cross-correlation matrix, receive a pilot signal from the two orthogonally polarized channels, estimate a local cross-depolarization matrix and a transmitter cross-polarization matrix using the pilot signal, apply a post-correction channel condition, receive a corrupted data signal from the two orthogonally polarized channels, and estimate an original data signal by processing the corrupted data signal using the transmitter base matrix, transmitter base cross-correlation matrix, transmitter cross-polarization matrix, local base matrix, local base cross-correlation matrix, and local cross-depolarization matrix. In some embodiments, the antenna arrangement comprises a set of dual polarized antennas. In some embodiments, the antenna arrangement comprises one or more pairs of separately polarized antennas.

It will be appreciated by one of ordinary skill in the art that techniques for receiving data transmissions in a communication system having dual polarized channels are disclosed. It will also be appreciated by one of ordinary skill in the art that the disclosed techniques are especially advantageous for embodiments in power and weight constrained communication systems such as for communication to or from a UAV enabled HAP. It will further be appreciated by one of ordinary skill in the art that data reception techniques can be implemented in three steps: A first step is to implement a stationary open loop using the apriori knowledge and lookup tables. A second step is to perform nonlinear prediction of the UAV flight dynamics and relative moment between the transmitter and the receiver. A third step in which Bayes optimal closed loop correction is performed.

Computer System

Figure 12:
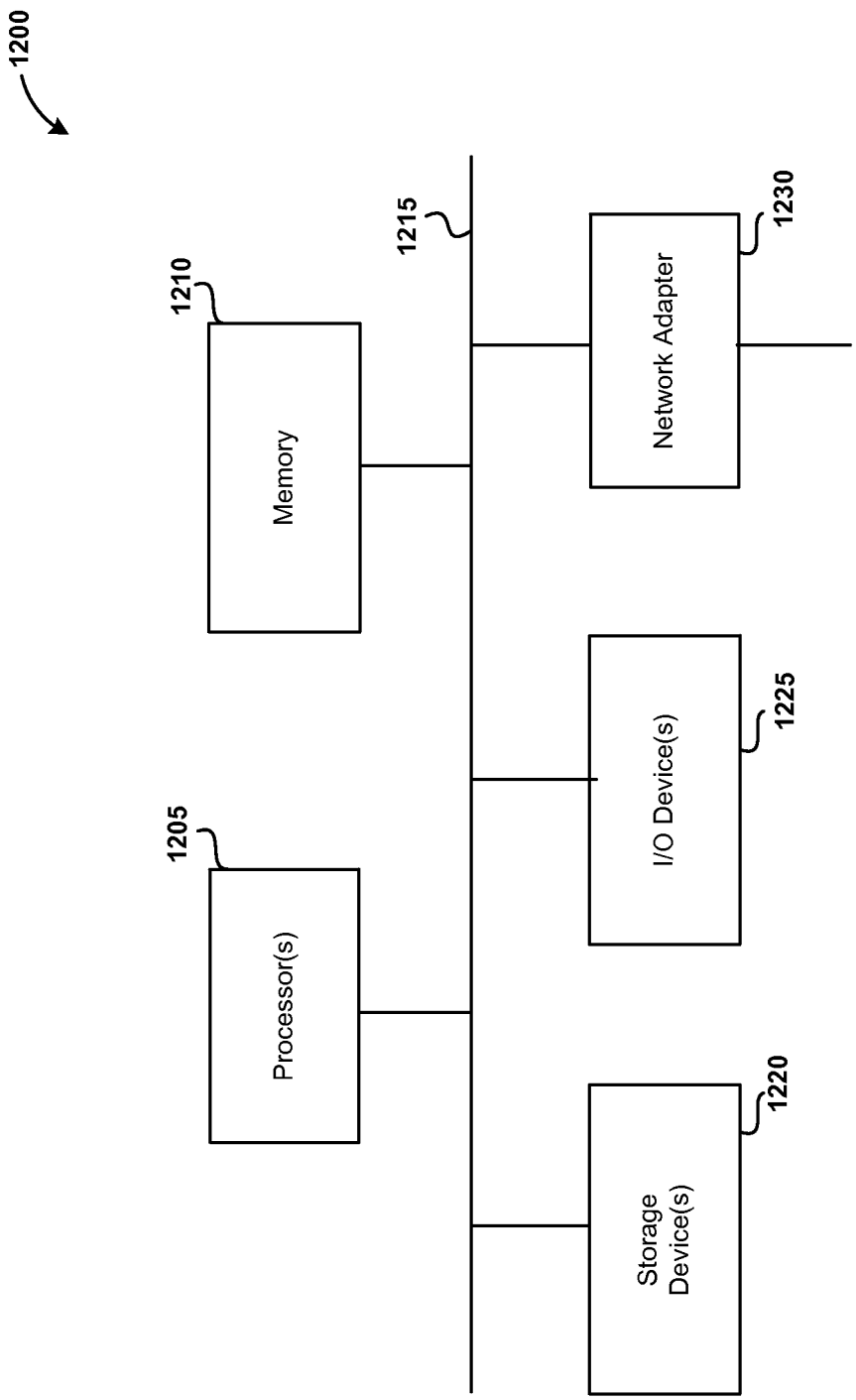
FIG. 12 is a block diagram of a computer system as may be used to implement features of some of the embodiments.

FIG. 12 is a block diagram of a computer system as may be used to implement features of some of the embodiments. The computing system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1210 and storage devices 1220 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1210 can be implemented as software and/or firmware to program the processor(s) 1205 to carry out actions described above. In some embodiments, such software or firmware may be initially provided to the processing system 1200 by downloading it from a remote system through the computing system 1200 (e.g., via network adapter 1230).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A receiver communications device comprising:
   an antenna arrangement configured to concurrently receive and transmit two independent signals along two orthogonally polarized fields, over two orthogonally polarized channels;
   at least one processor; and
   at least one memory comprising instructions configured to cause the at least one processor to:
   determine an apriori channel matrix;
   estimate a transmitter base matrix, and a transmitter base cross-correlation matrix;
   calculate a local base matrix and a local base cross-correlation matrix;
   receive a pilot signal from the two orthogonally polarized channels;
   estimate a local cross-depolarization matrix and a transmitter cross-polarization matrix using the pilot signal;
   apply a post-correction channel condition;
   receive a corrupted data signal from the two orthogonally polarized channels; and
   estimate an original data signal by processing the corrupted data signal using the transmitter base matrix, transmitter base cross-correlation matrix, transmitter cross-polarization matrix, local base matrix, local base cross-correlation matrix, and local cross-depolarization matrix.

2. The receiver communications device of claim 1, wherein to determine an apriori channel matrix comprises consulting a look-up-table (LUT).

3. The receiver communications device of claim 1, wherein to estimate an original data signal comprises determining the original data signal via the:

$$\begin{bmatrix} U_h \\ U_v \end{bmatrix} = (\hat{A}_r + (\hat{B}_r)(\Delta \hat{C}_r))^T H(\hat{A}_t + (\hat{B}_t)(\Delta \hat{C}_t)) \begin{bmatrix} S_h \\ S_v \end{bmatrix}$$

where $A_r$ is the local base matrix, $B_r$ local base cross-correlation matrix, $C_r$ al cross-depolarization matrix, $A_t$ transmitter base matrix, $B_t$ transmitter base cross-correlation matrix, $C_t$ transmitter cross-polarization matrix, $U_h$ is a horizontally polarized component of the corrupted data signal, $U_v$ is a vertically polarized received component of the corrupted data signal, $S_h$ horizontally polarized component of the original data signal, $S_v$ horizontally polarized component of the original data signal, and H is the apriori channel matrix.

4. The receiver communications device of claim 1, wherein the receiver communications device is part of an unmanned aerial vehicle.

5. The receiver communications device of claim 1, wherein the receiver communications device is configured to perform portions of the instructions iteratively.

6. The receiver communications device of claim 1, wherein estimating a local cross-depolarization matrix and a transmitter cross-polarization matrix comprises applying a maximum likelihood estimation of a statistical model.

7. The receiver communications device of claim 1, wherein applying a post-correction channel condition comprises performing a Bayesian update.

8. The receiver communication device of claim 1, wherein the antenna arrangement comprises a set of dual polarized antennas.

9. The receiver communication device of claim 1, wherein the antenna arrangement comprises one or more pairs of separately polarized antennas.

10. A computer-implemented method for estimating an original data signal from a corrupted data signal received at two substantially orthogonally polarized antennas, the method comprising:

determining an apriori channel matrix;
estimating a transmitter base matrix and a transmitter base cross-correlation matrix;
calculating a local base matrix and a local base cross-correlation matrix;
receiving a pilot signal at the first antenna and the second antenna;
estimating a local cross-depolarization matrix and a transmitter cross-polarization matrix using the pilot signal;
applying a post-correction channel condition;
receiving a corrupted data signal at the first antenna and the second antenna corrupted by the channel; and
estimating an original data signal by processing the corrupted data signal using the transmitter base matrix, transmitter base cross-correlation matrix, transmitter cross-polarization matrix, local base matrix, local base cross-correlation matrix, and local cross-depolarization matrix.

11. The computer-implemented method of claim 10, wherein to determine an apriori channel matrix comprises consulting a look-up-table (LUT).

12. The computer-implemented method of claim 10, wherein to estimate an original data signal comprises determining the original data signal via the:

$$\begin{bmatrix} U_h \\ U_v \end{bmatrix} = (\hat{A}_r + (\hat{B}_r)(\Delta \hat{C}_r))^T H (\hat{A}_t + (\hat{B}_t)(\Delta \hat{C}_t)) \begin{bmatrix} S_h \\ S_v \end{bmatrix}$$

where $A_r$ is the local base matrix, $B_r$ local base cross-correlation matrix, $C_r$ al cross-depolarization matrix, $A_t$ transmitter base matrix, $B_t$ transmitter base cross-correlation matrix, $C_t$ transmitter cross-polarization matrix, $U_h$ is a horizontally polarized component of the corrupted data signal, $U_v$ is a vertically polarized received component of the corrupted data signal, $S_h$ horizontally polarized component of the original data signal, $S_v$ horizontally polarized component of the original data signal, and H is the apriori channel matrix.

13. The computer-implemented method of claim 10, wherein the receiver communications device is configured to perform portions of the instructions iteratively.

14. The computer-implemented method of claim 10, wherein estimating a local cross-depolarization matrix and a transmitter cross-polarization matrix comprises applying a maximum likelihood estimation of a statistical model.

15. The computer-implemented method of claim 10, wherein applying a post-correction channel condition comprises performing a Bayesian update.

16. The computer-implemented method of claim 10, wherein the estimating includes:
decoupling a non-linear contribution to signal corruption due to dynamic movement of a transmitter of the original data signal.

17. A non-transitory computer-readable medium comprising instructions configured to case at least one computer processor to estimate an original data signal from a corrupted data signal received at two substantially orthogonally polarized antennas by:

determining an apriori channel matrix;
estimating a transmitter base matrix and a transmitter base cross-correlation matrix;
calculating a local base matrix and a local base cross-correlation matrix;
receiving a pilot signal at the first antenna and the second antenna;
estimating a local cross-depolarization matrix and a transmitter cross-polarization matrix using the pilot signal;
applying a post-correction channel condition;
receiving a corrupted data signal at the first antenna and the second antenna corrupted by the channel; and
estimating an original data signal by processing the corrupted data signal using the transmitter base matrix, transmitter base cross-correlation matrix, transmitter cross-polarization matrix, local base matrix, local base cross-correlation matrix, and local cross-depolarization matrix.

18. The non-transitory computer-readable medium of claim 17, wherein to determine an apriori channel matrix comprises consulting a look-up-table (LUT).

19. The non-transitory computer-readable medium of claim 17, wherein to estimate an original data signal comprises determining the original data signal via the relation:

$$\begin{bmatrix} U_h \\ U_v \end{bmatrix} = (\hat{A}_r + (\hat{B}_r)(\Delta \hat{C}_r))^T H (\hat{A}_t + (\hat{B}_t)(\Delta \hat{C}_t)) \begin{bmatrix} S_h \\ S_v \end{bmatrix}$$

where $A_r$ is the local base matrix, $B_r$ local base cross-correlation matrix, $C_r$ al cross-depolarization matrix, $A_t$ transmitter base matrix, $B_t$ transmitter base cross-correlation matrix, $C_t$ transmitter cross-polarization matrix, $U_h$ is a horizontally polarized component of the corrupted data signal, $U_v$ is a vertically polarized received component of the corrupted data signal, $S_h$ horizontally polarized component of the original data signal, $S_v$ horizontally polarized component of the original data signal, and H is the apriori channel matrix.

20. The non-transitory computer-readable medium of claim 17, wherein the receiver communications device is configured to perform portions of the instructions iteratively.

21. The non-transitory computer-readable medium of claim 17, wherein estimating a local cross-depolarization matrix and a transmitter cross-polarization matrix comprises applying a maximum likelihood estimation of a statistical model.

22. The non-transitory computer-readable medium of claim 17, wherein applying a post-correction channel condition comprises performing a Bayesian update.

* * * * *